United States Patent [19]  
Emmert

[11] 4,085,908  
[45] Apr. 25, 1978

[54] TAPE RECORDER CONTROL UNIT

[75] Inventor: Reinhold Emmert, Furth, Germany

[73] Assignee: Grundig E.M.V. Elektro-Mechanische Versuchsanstalt Max Grundig, Furth, Germany

[21] Appl. No.: 733,030

[22] Filed: Oct. 18, 1976

[30] Foreign Application Priority Data

Dec. 19, 1975 Germany .............................. 2557319

[51] Int. Cl.² ...................... G11B 15/10; G11B 15/29; G11B 15/30
[52] U.S. Cl. ...................................... 242/201; 242/209
[58] Field of Search ............... 242/201, 206, 209, 202, 242/210, 203, 204, 67.4, 67.5, 208

[56] References Cited

U.S. PATENT DOCUMENTS 2,948,485 8/1960 Cotte ..................................... 242/201
3,900,174 8/1975 Morimoto et al. ................... 242/201

Primary Examiner—George F. Mautz

[57] ABSTRACT

A control unit for a tape recorder of the cassette type is provided. The control unit includes a swing arm carrying thereon at least one idler roller to engage and drive the recorder take-up reel driver or supply reel driver. The swing arm, in turn, is frictionally connected to a fly wheel driven by the tape recorder motor so that by changing the polarity of the drive motor voltage, the appropriate mechanical interconnection may be effected through the swing arm idler to attain the desired drive function.

10 Claims, 2 Drawing Figures

TAPE RECORDER CONTROL UNIT

BACKGROUND OF THE INVENTION

The present invention relates to a control unit for a tape recording device and more particularly to a mechanical control assembly for use in a cassette type tape recorder.

Heretofore, cassette type tape recorders have generally relied on electro-mechanical type control units to control their several modes of operation (i.e., start, stop, rewind, etc.). Such units utilize solenoids to convert a control signal (i.e., the pressing of a button on the face of the unit) into the mechanical motions necessary to make the required interconnections between the recorder drive motor and appropriate mechanisms such as the tape transport drive, a supply reel driver or take-up reel driver. Such tape recorders generally have a single motor which drives a tape transport shaft and associated fly wheel either directly or through a belt. The tape is moved by virtue of its passing in contact with the tape transport shaft and being kept in contact with the shaft by a pressure roller. To reverse direction of the tape, the pressure roller is released and the motor direction may be reversed or appropriate idlers driven off the tape transport shaft may be utilized.

Prior art controls often rely on solenoids to release a tension spring to bring the pressure rollers into operative position opposite the tape from the tape transport shaft to accomplish the desired drive functions. A problem arises in connection with such recorders, and particularly battery operated recorders in that sufficient power must be available to set the solenoids to counteract the tension springs.

Further, such prior art arrangements are somewhat complicated and hence relatively expensive to produce.

In view of the above, it is the principal object of the present invention to provide a simplified and more efficient control for a cassette type tape recorder than heretofore was available.

SUMMARY OF THE INVENTION

The above and other beneficial objects and advantages are attained in accordance with the present invention by providing the improved control unit for a cassette type tape recorder described herein. The control unit includes a swing arm on which several idler wheels are mounted. The arm itself is mounted to pivot about the center of a fly wheel mounted to the tape transport shaft so that a frictional connection can be made between at least one idler wheel and the fly wheel. By suitably rotating the swing arm about its pivot, a frictional engagement can be made between (1) the periphery of the fly wheel or a flange mounted thereon, (2) an idler wheel, and (3) the cassette take-up reel driver or supply reel driver. A friction clutch connects the swing arm to the fly wheel so that the swing arm swings in response to a change of direction of rotation of the fly wheel. To insure that during change-over between modes of operation frictional contact between the idler wheel and fly wheel is maintained, a spring-loaded curved track is placed in the path of motion of at least one of the idler wheels.

A cam which moves with the swing arm moves a lever on which the pressure roller is mounted so that the pressure roller moves into or out of engagement with the tape transport shaft depending on whether the cassette is being driven in the "start" (i.e., record or playback) or rewind mode. To this end, when the pressure roller is taken out of engagement, it is locked in such position until the swing arm is utilized to unlock the pressure roller level.

DETAILED DESCRIPTION OF THE PREFERRED EMBODIMENT

Figure 1:
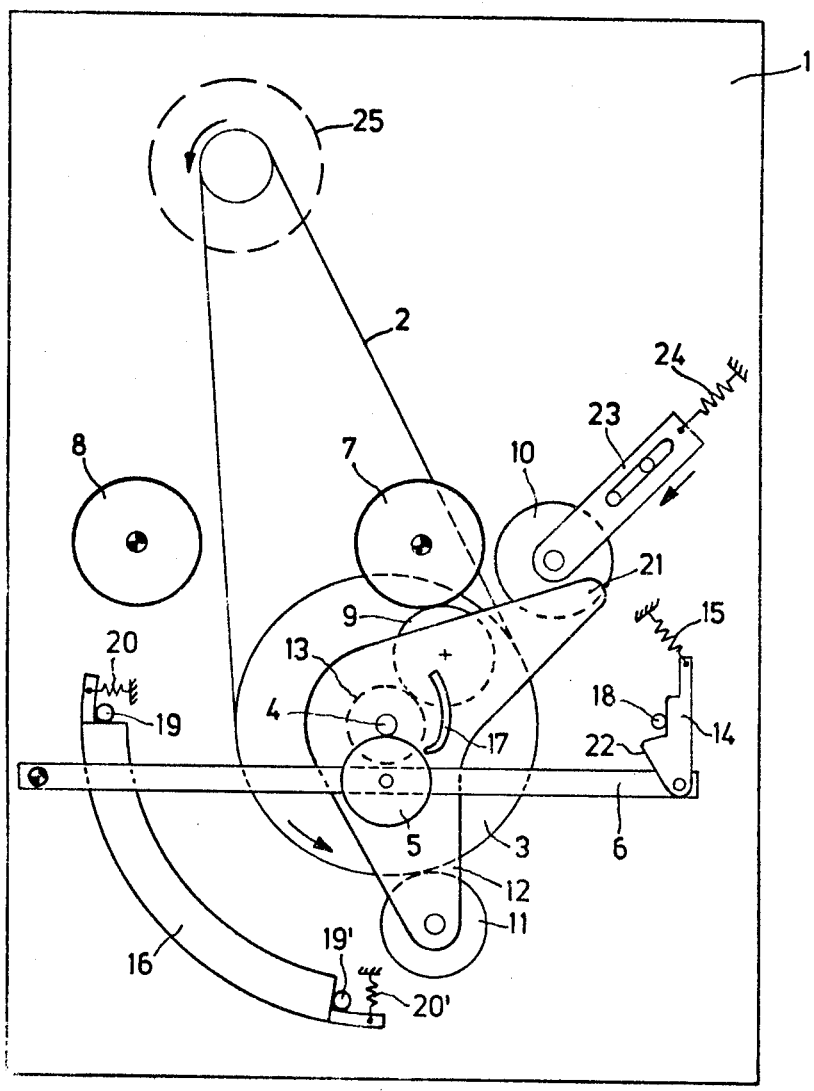
FIG. 1 is a simplified schematic representation of the control unit of the present invention showing the various components thereof in position during the "start" mode which is used for "record" and "playback" operations; and, FIG. 2 is a schematic representation similar to FIG. 1 showing the various components of the control unit when the recorder is in its rewind mode.

Reference is now made to FIG. 1 wherein the present control unit is shown as comprising a base plate 1 upon which a drive motor 25 is mounted. The drive motor is connected by means of a belt 2 to a fly wheel 3 which rotates about tape transport shaft 4. The tape transport shaft is supported from below in a bearing (not shown) and from above by an arm (not shown) which, in turn, is mounted to the base plate.

During normal forward operation of the tape recorder (i.e., when the recorder is either recording or playing back) the tape is held in engagement with the tape transport shaft 4 by a pressure roller 5. This insures that the tape travels at the proper speed as it passes the head of the tape recorder. In accordance with the present invention, the pressure roller 5 is rotatably mounted to pressure roller lever 6. As will be discussed forthwith, the lever 6 is pivotally mounted to base plate 1. In addition to the above, there is also rotatably mounted to base plate 1 a take-up reel driver 7 and supply reel driver 8. Both of these drivers comprise rollers mounted in suitable support bearings for free rotation. The drivers may include sprockets to engage mating parts of the tape cassette.

As will be discussed forthwith, drivers 7 and 8 are positioned on base plate 1 so as to enable them to be brought into engagement with the fly wheel 3 via an idler wheel 9 (called the "start wheel") which, in turn, is mounted on a boomerang-shaped swing arm 12 pivotally mounted about shaft 4. The take-up reel 7 may also be brought into engagement with fly wheel 3 via idler wheel 10 (called the "fast forward" wheel) which, in turn, is mounted to a slide 23. As will be described forthwith, the fast forward idler 10 contacts the periphery of fly wheel 3 in distinction to idler wheel 9 which contacts a flange 13 and hence the take-up reel driver will be driven at a faster speed when idler 10 is engaged than when idler 9 is engaged.

Figure 2:
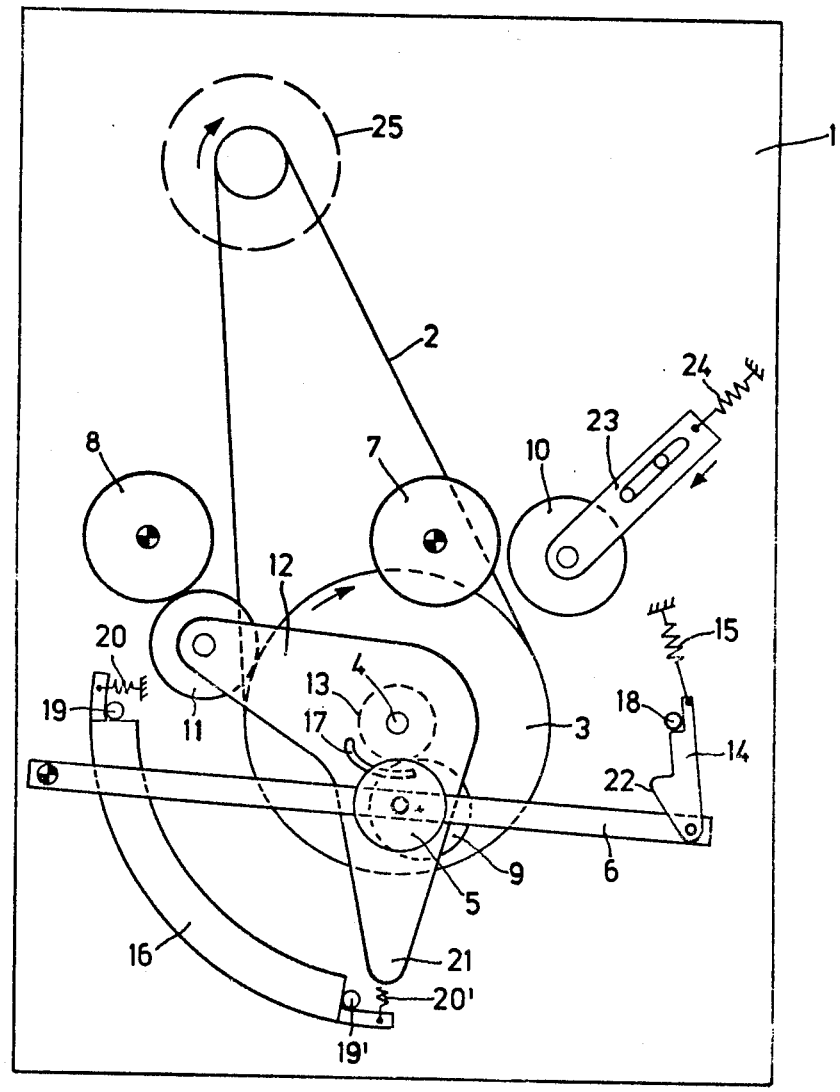

Referring briefly to FIG. 2, it can be seen that the supply reel driver 8 may be brought into engagement with fly wheel 3 via idler wheel 11 (called the "rewind" wheel) which is mounted on swing arm 12.

Referring back to FIG. 1, it can be seen that fly wheel 3 is provided with a flange 13 which is formed of felt or other material having a high co-efficient of friction so that when the swing arm is brought in contact with the flange 13, the flange acts as a friction-clutch to turn the swing arm in the direction of rotation of fly wheel 3. This rotation continues until further rotation is prevented by a stop (in the form of an idler wheel contacting one of the drive wheels) which counteracts the torque of the friction clutch. Thus, start wheel 9 acts to stop further rotation of the swing arm in the counter-clockwise direction when the swing arm is rotated to the position shown in FIG. 1 (i.e., in engagement with flange 13 and the take-up reel driver 7). Similarly, by changing the direction of rotation of fly wheel 3, the start wheel 9 can be disengaged from the position shown in FIG. 1 permitting the swing arm 12 to rotate with the fly wheel under the effect of the friction clutch until further rotation of the swing arm in the clockwise direction is prevented by the reverse wind idler 11 engaging the supply reel driver 8. Since the idler 11 engages the periphery of fly wheel 3, it should be appreciated that when the idler 11 engages the supply reel 8, it serves to drive the supply reel 8 from the fly wheel 3.

Thus, it can be seen that the electrical controls for switching the polarity of the voltage applied to the drive motor 25 also serve to switch the modes of mechanical operation of the unit since the swing arm will follow changes in the direction of rotation of the fly wheel. The tape recorder, thus need only be provided with "start" and "rewind" switches since a "stop" function may readily be attained by merely disconnecting the power to the drive motor. If, for example, the operator of the device places the unit in the operating mode "start" the control mechanism will assume the position depicted in FIG. 1 which is the position necessary for recording or for playback. As shown, the motor 25 will rotate counterclockwise. Fly wheel 3 along with tape transport shaft 4 also rotate counterclockwise by virtue of the belt drive 2.

The pressure roller 5 serves to hold the tape of the inserted tape cassette against the tape transport shaft 4 to move the tape at the proper speed and direction for recording of playing. The pressure roller 5 is rotatably mounted to the pressure roller lever 6 and is biased in position by a tension spring 15 acting through latch 14. As shown, a tension spring is attached to the base plate 1. The "start" idler wheel 9 is engaged between flange 13 of the fly wheel 3 and take-up wheel driver 7 to drive the take-up reel. As with the flange 13, the start wheel 9 may be of a material of relatively high co-efficient of friction so as to insure a proper frictional engagement and hence constant drive speed.

To reverse the direction of movement of the tape all that need be done is to reverse the direction of rotation of motor 25 so that the motor rotates in the clockwise direction as shown in FIG. 2. This reversal of the motor speed causes the fly wheel 3 to now rotate in the clockwise direction. Because of the frictional engagement between the swing arm 12 and flange 13, the swing arm will also rotate in a clockwise direction thereby disengaging idler 9 from take-up reel 7 and eventually causing the engagement of idler 11 and supply reel 8. As the swing arm rotates, idler 11 is maintained in constant engagement with fly wheel 3 by virtue of the arcuate track 16 which is biased by springs 20 and 20' against pins 19 and 19' to maintain idler 11 in contact with the fly wheel periphery.

A cam 17 is attached to swing arm 12 and positioned to engage the pressure roller lever 6 as the swing arm rotates. The cam is designed to lift lever 6 and, accordingly, roller 5 which is mounted on lever 6 away from the tape transport shaft 4. A pin 18 extends from the base plate 1 adjacent latch 14 so that when lever 6 is lifted by the cam, the latch 14 disengages from the pin.

As swing arm 12 continues to rotate in the clockwise direction, cam 17 will eventually disengage from the pressure roller lever 6 and idler 11 will disengage from track 16 to engage the supply reel 8. At this time, all the movable elements will have assumed the position shown in FIG. 2.

In summary then, the present invention provides a mechanical assembly which is electrically controllable to cause the disengagement of the "start" idler wheel 9 from take-up reel driver 7 as well as the lifting of the pressure roller 5 from the tape transport shaft 4 and to cause the engagement of the reverse idler wheel 11 and the supply reel 8 for rewinding of the tape when the polarity of the driving motor voltage is switched from the playing direction to the rewind direction.

Changing the polarity of the drive motor voltage back to the playing direction causes the above to happen in reverse order. That is, the change of polarity to motor 25 changes the direction of rotation of fly wheel 3 to the counterclockwise direction and also causes the swing arm to rotate counterclockwise. The swing arm thus leaves the position shown in FIG. 2 and swings away from engagement with the supply reel driver 8. After this, the rewind idler wheel 11 enters track 16 and as the swing arm rotates, the free end 21 of the arm (i.e., the end opposite the end carrying idler 11) engages face 22 of latch 14 to disengage latch 14 from pin 18 and thereby permit the lever arm 6 to move under the influence of spring 15.

As the swing arm rotates, cam 17 carried by the swing arm will eventually disengage the lever arm 6 so that spring 15 can bring pressure roller 5 into engagement with the tone shaft.

A "fast forward" mode for the tape recorder control of the present invention is attained utilizing slide 23 to which idler 10 is mounted. When the slide is moved in the direction indicated by the arrows in FIGS. 1 and 2 (i.e., against the force of tension spring 24) it will engage the free end of swing arm 12 rotating the swing arm clockwise for a small amount. As a result, the engagement between start wheel 9 and take-up reel 7 is interrupted. Simultaneously, the fast advance idler 10 mounted to the forward end of slide 23 will engage the periphery of the fly wheel 3 and take-up reel driver 7 thus driving the take-up reel at a rate faster than the rate at which idler 9 was driving driver 7. Thus, whereas during normal "start" operation take-up reel driver 7 is driven through idler 9 engaging flange 13, for fast forward operation take-up reel 7 is driven by idler 10 engaging the periphery of the fly wheel 3.

In the above described embodiment, the start and rewind functions are accomplished through separate idlers 9 and 11. It should be obvious that if desired a single idler could be mounted on the arm in position to rotate with the arm to engage both the take-up reel driver at one time and supply reel driver at another time. Similarly, other modifications may be made without departing from the scope of the present invention as set forth in the following claims.

Having thus described the invention, what is claimed is:

1. In a cassette type tape recorder of the type having: "start", "stop" and "rewind" modes of operation, a d.c. drive motor, means for altering the polarity of the voltage applied to said drive motor, a tape transport shaft driven by said drive motor, a fly wheel mounted concentrically about said shaft, a pressure roller lever, a pressure roller mounted for rotation on said lever and adapted to engage a length of tape to hold said tape in operational engagement with said shaft, a tape take-up reel driver, a tape supply reel driver and idler means mounted to be driven through said flywheel and to be coupled to the reel drivers; the improvement comprising: a swing arm rotatably mounted about said shaft, clutch means for frictionally connecting said swing arm to said fly wheel, said idler means being mounted to said swing arm for movement therewith whereby reversal of the direction of said drive motor causes said swing arm to rotate from a first position wherein said idler means engages one of said drivers to a second position wherein said idler means engages the other of said drivers.

2. The invention in accordance with claim 1 further comprising a circular track positioned within said recorder in the path of motion of said idler means, said track being positioned to engage said idler means and urge said idler means against said fly wheel as said idler means switches between said first and second positions.

3. The invention in accordance with claim 2 further comprising cam means mounted on said swing arm, said cam means being positioned to lift said pressure roller lever to lift said pressure roller from engagement with said shaft and lower said pressure roller into engagement with said shaft.

4. The invention in accordance with claim 3 wherein said idler means includes two idler rollers mounted to said swing arm, one of said idler rollers being adapted to engage said take-up reel driver when said swing arm is in said first position, the other of said idler rollers being adapted to engage said supply reel driver when said swing arm is in said second position.

5. The invention in accordance with claim 4 further comprising latch means connected to said lever, said latch means being operable to hold said lever arm lifted from engagement with said shaft, and release means connected to said swing arm to release said latch.

6. The invention in accordance with claim 2 wherein said track is spring biased to urge said idler into positive frictional engagement with said fly wheel.

7. The invention in accordance with claim 1 wherein the idler means is mounted to be coupled to the tape transport shaft.

8. The invention in accordance with claim 1 wherein the idler means is mounted to be coupled to the fly wheel.

9. The invention in accordance with claim 1 wherein said idler means includes at least one idler wheel mounted to engage the take-up reel driver.

10. The invention in accordance with claim 1 wherein said idler means includes at least one idler wheel mounted to engage the supply reel driver.

* * * * *